June 28, 1955
G. E. BULLOCK
2,711,625
FRUIT PICKING APPARATUS
Filed July 9, 1951
4 Sheets-Sheet 1
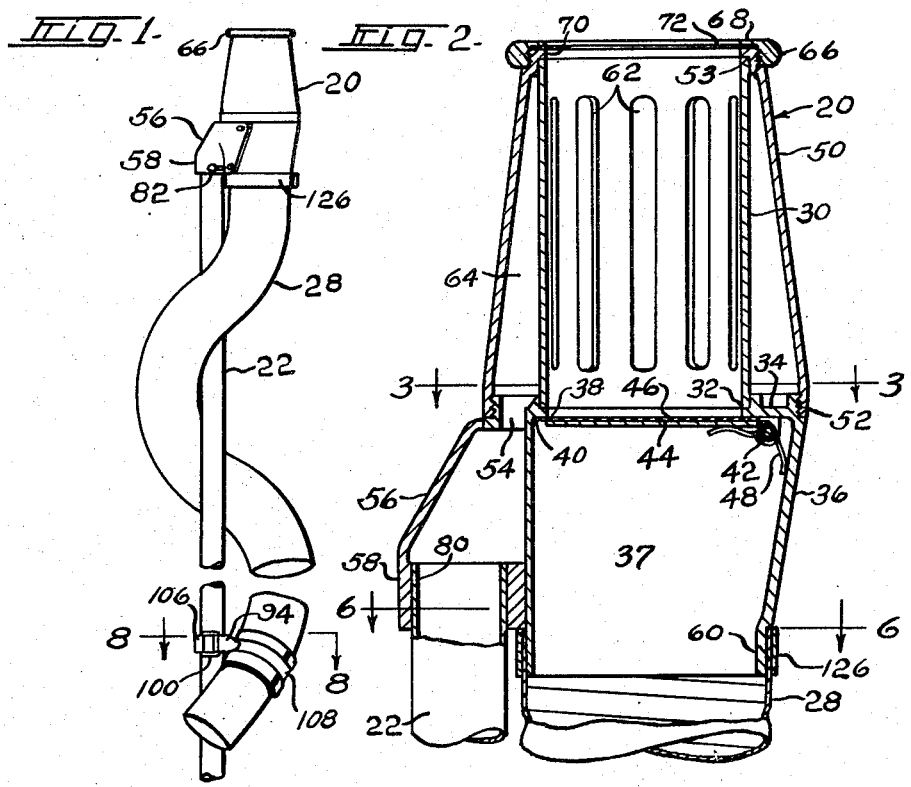
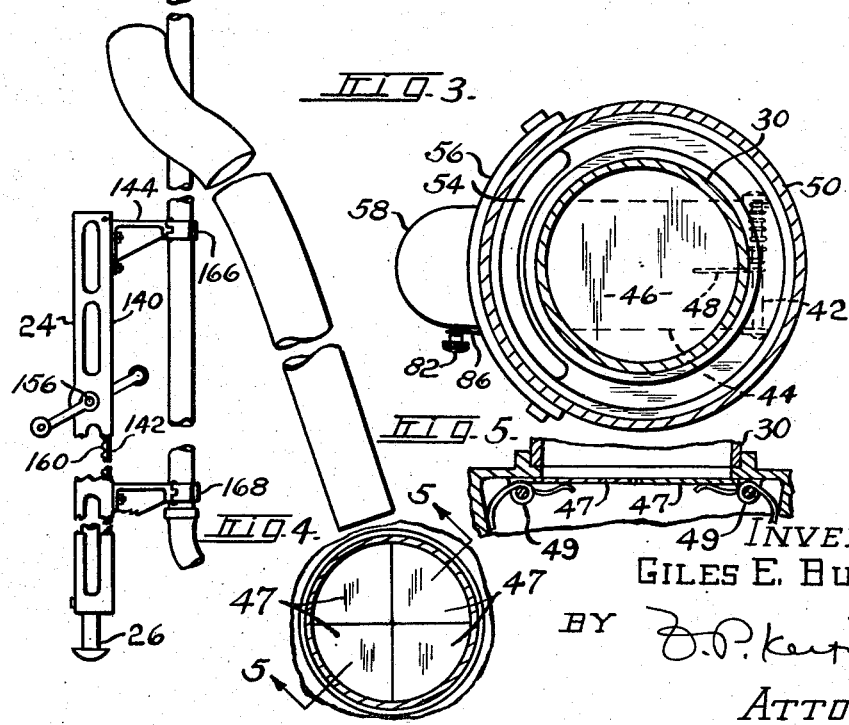
INVENTOR
GILES E. BULLOCK
BY
ATTORNEY

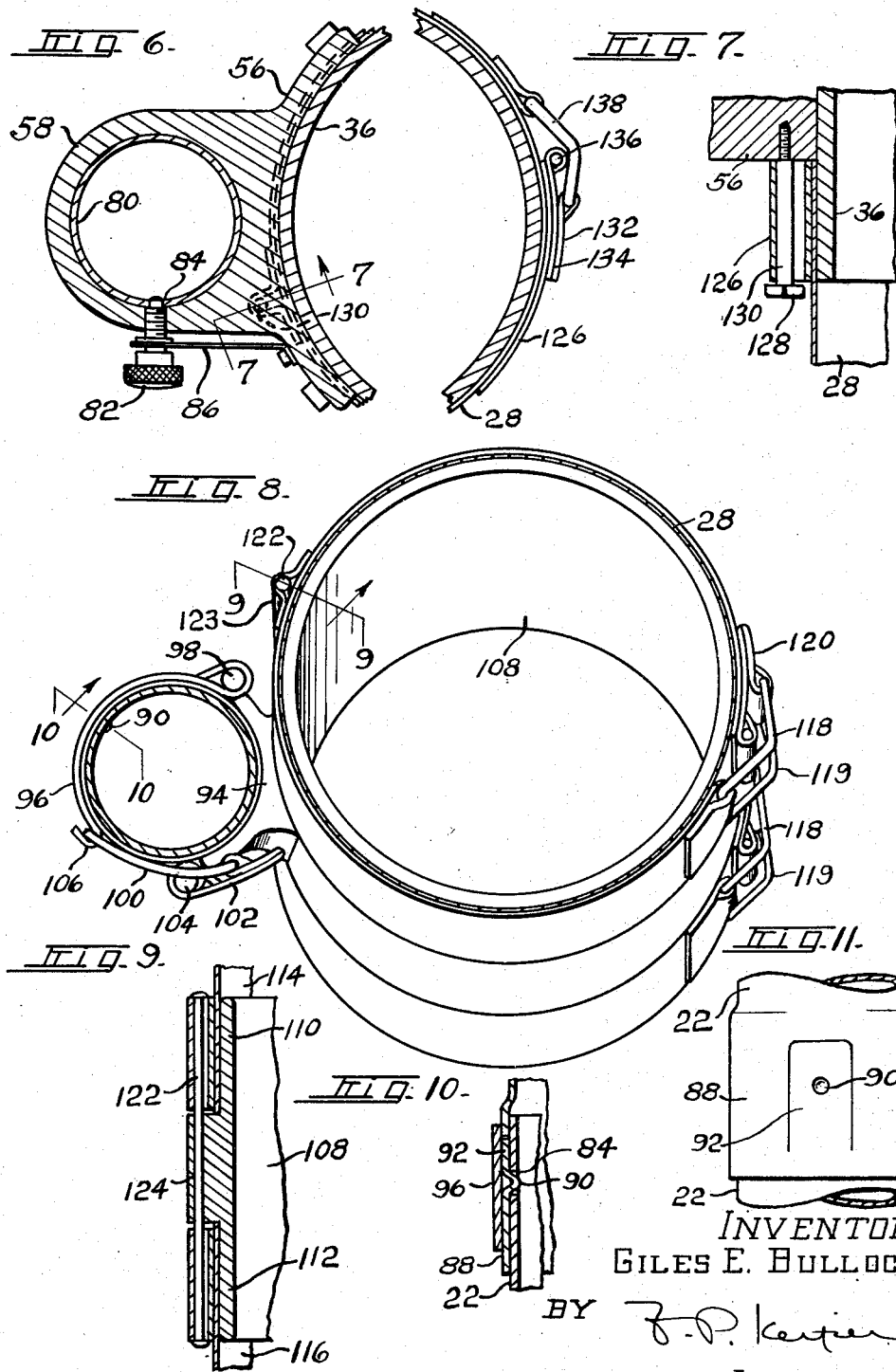

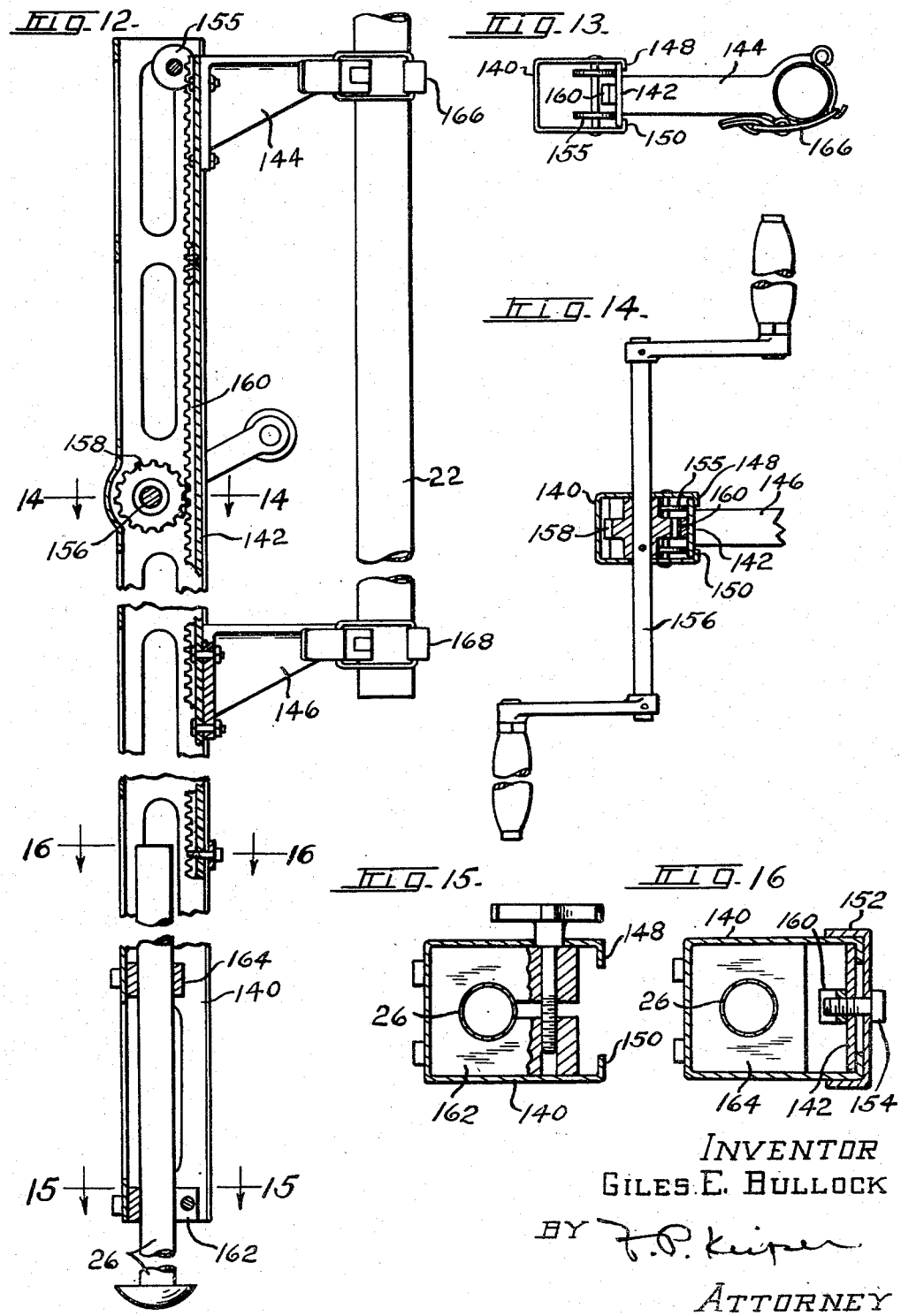

June 28, 1955 G. E. BULLOCK 2,711,625
FRUIT PICKING APPARATUS
Filed July 9, 1951 4 Sheets-Sheet 4
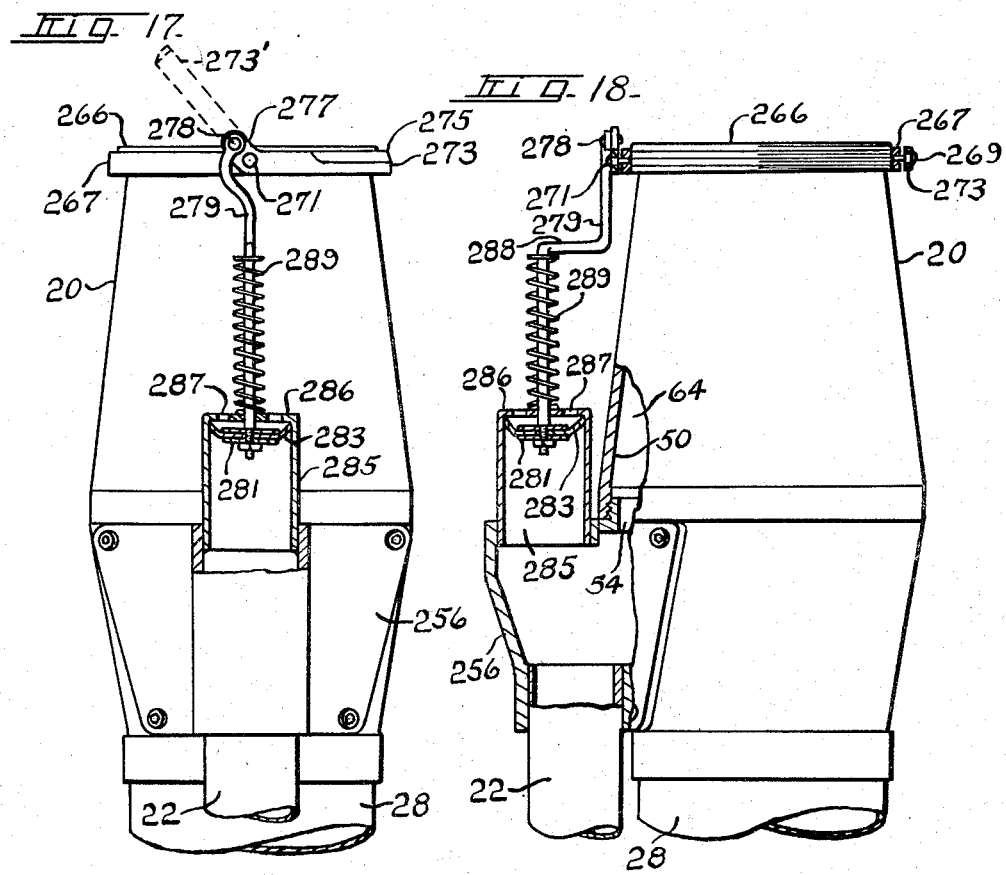
INVENTOR
GILES E. BULLOCK
BY *F. P. Keiper*
ATTORNEY United States Patent Office 2,711,625
Patented June 28, 1955

2,711,625

FRUIT PICKING APPARATUS

Giles E. Bullock, Rochester, N. Y.

Application July 9, 1951, Serial No. 235,689

12 Claims. (Cl. 56—332)

This invention relates to fruit picking apparatus, and more particularly to vacuum actuated apparatus and improved manipulating and delivery means therefor.

The present invention has to do with suction fruit picking apparatus, wherein the picking force developed by suction is limited to that necessary to sever the fruit by applying a straining force to the stem, and in which the fruit, upon being picked, is retarded in its initial fall, and suitably retarded in its delivery to a gathering point in a manner to avoid injury to the fruit.

It is an object of the invention to provide a suction device in the form of a cylindrical passage open at one end to receive fruit such as apples, peaches, oranges, and the like; and in which each individual fruit acts to restrict the opening sufficiently to cause a gradual but rapid decrease in pressure within the device, whereby to quickly strain the stem of the fruit to the breaking point, the device being so designed that upon further movement of the fruit through the opening immediately after severing, restriction is terminated, and the subatmospheric pressure within the device is released, after which the fruit gently falls and passes through a valve at the other end of the cylindrical passage.

It is a further object of the invention to provide a vacuum picking device wherein the picking force may not substantially exceed that required to pick the fruit, and which force is immediately dispelled substantially the instant the stem is severed.

It is a still further object of the invention to provide a vacuum picking device wherein suction is delivered to the picking device substantially uniformly around its circumference, and over substantially its entire length, whereby fruit in being picked is essentially buoyed or guided by the uniform cushioning effects of air currents within the device.

Still another object of the invention is to provide a vacuum picking device in which movement of the fruit resulting from the picking thereof is retarded by an air cushioning effect immediately upon being picked, and wherein the further delivery of such fruit is controlled to prevent injury thereto.

A still further object of the invention is the provision of a substantially cylindrical open-ended picking device having a normally closed flap valve in the base thereof, and to which suction is applied through apertures over substantially the entire length and circumference of the device, whereby vacuum picking force is rendered effective only as the fruit constricts the open end.

A further object of the invention is the provision of stem severing mechanism acting in response to the constricting of the open end of the vacuum picking apparatus, during which instant the stem is subjected to strain.

Other objects and advantages of the invention have to do with the mechanism for supporting the picking head and facilitating the elevation thereof and maneuvering the same into proximity with fruit at different levels.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation of the vacuum picking apparatus extended for reaching fruit at a high level, with parts broken to reduce the over-all length;

Figure 2 is a central longitudinal sectional view on an enlarged scale taken through the picking head;

Figure 3 is a transverse section taken substantially on the line 3—3 of Figure 2;

Figure 4 is a fragmentary sectional view like Figure 3, showing a modified valve arrangement;

Figure 5 is a sectional view taken substantially on the line 5—5 of Figure 4;

Figure 6 is a broken sectional view on an enlarged scale taken substantially on the line 6—6 of Figure 2;

Figure 7 is a detailed fragmentary sectional view on an enlarged scale taken on the line 7—7 of Figure 5;

Figure 8 is a sectional view on an enlarged scale through the conduit and vacuum supply pipe, taken on the line 8—8 of Figure 1, and showing the conduit support and coupling;

Figure 9 is a sectional detailed fragmentary view on an enlarged scale taken on the line 9—9 of Figure 8;

Figure 10 is a longitudinal sectional detailed fragmentary view on an enlarged scale taken on the line 10—10 of Figure 8, through the vacuum supply pipe coupling;

Figure 11 is a fragmentary side elevational view on an enlarged scale of the coupling without the conduit support;

Figure 12 is a side elevation on an enlarged scale partially in section, of the telescopic manual elevating mechanism;

Figure 13 is a top plan view of such mechanism;

Figure 14 is a fragmentary sectional view taken on the line 14—14 of Figure 11;

Figure 15 is a fragmentary sectional view on an enlarged scale taken on the line 15—15 of Figure 11;

Figure 16 is a sectional view on an enlarged scale taken on the line 16—16 of Figure 11;

Figure 17 is a side elevation of a modified form of the invention, with parts in section;

Figure 18 is a view similar to Figure 17, in front elevation with parts shown in section;

Figure 19 is a detailed plan view of the annular ring employed at the open end of the picking head; and Figure 20 is a fragmentary sectional view taken on the line 20—20 of Figure 19.

In Figure 1, there is shown a complete assemblage of a fruit picking device arranged for manual elevation and direction for fruit picking puropses. The picking head 20 is mounted on a tube 22, preferably comprising convenient sections telescopically joined together, the lower end of which is mounted on a manual elevator mechanism 24, having an adjustable foot 26 adapted to rest on the ground. The head 20 discharges into a helical flexible conduit 28 supported on the tube 22, and by varying the helix angle, the rate of movement of fruit therethrough may be controlled in order to protect the same from damage. The tube 22 is connected at its lower end to a power vacuum source.

The picking head (see Figure 2) comprises an open-ended cylinder or tubular member connected to a source of suction, the lower end of the cylinder being provided with a flap valve to allow discharge of picked fruit. More particularly, the head comprises a cylindrical member 30, mounted on an annular shoulder 32 disposed on the upper wall 34 of a base or valve housing member 36, the housing member beneath the valve forming a discharge chamber 37. The wall 34 is annular, forming a discharge opening 38 flush with the lower end of the cylinder. The under side of the wall 34 forms a flat valve seat 40, and to one side upon a horizontal pivot 42 is pivoted a simple flap valve 44, having preferably a rubber disk-like valve face 46. Such flap valve is normally held closed by a light coil spring 48. Such valve may be of the segmental type, if desired, as shown in Figures 4 and 5, wherein 90° segments 47 are each hinged and held in closed position by their respective light springs 49. Such a valve permits the fruit to traverse a course substantially in alignment with its axial course through the member 30.

The cylindrical member 30 is held on the annular wall 34 of the member 36 by a slightly tapered jacket member 50, screw-threaded on the base member as at 52, such jacket having an annular shoulder 53 at its upper end to engage the upper end of the cylinder 30. The annular wall 34 is provided with an arcuate port 54, and the exterior of the housing is provided with a shroud-like member 56 effecting a passageway to the arcuate port. The shroud-like member extends downwardly terminating in a sleeve 58 adapted to make connection with the upper end of the suction and support tube 22. The skirt-like wall of the valve housing, including the deformed portion 56, terminates in the form of a circular sleeve 60 or discharge outlet adapted to be connected with the flexible conduit 28. Thus, there is provided a suction passage from tube 22, through port 54 into the annular space 64 formed by the jacket 50 and cylinder 30, such passage being isolated from the valve housing or outlet except as through the valve 44.

The cylindrical member 30 is preferably provided with a plurality of ports in the form of elongated slots 62 in its side wall, such slots being disposed substantially uniformly around the periphery, and affording relatively unimpeded communication into the annular chamber 64 formed by the jacket 50 and cylinder 30 from the region within the cylinder. Thus, when suction is applied to the tube 22, air is withdrawn from the region within the cylinder through substantially the entire length and diameter of the cylinder wall.

The tip end of the jacket is provided with a flanged clamp nut or ring 66, adapted to secure between the flange 68 and the end 70 of the jacket wall an annular constricting ring 72 of light rubber or rubber-like material, the inner diameter of which is as great or less than the diameter of the fruit to be picked, depending on the fruit size. Such ring is preferably composed of an outer continuous annular portion 74 with integral radially inwardly directed fingers 76 and a thin latex-like rubber webbing 78 supported resiliently by the fingers, the webbing being adhesively bonded or vulcanized to the ring and finger portion. Such ring, when subjected to unduly large fruit, is dished slightly as the fruit passes therethrough, but the extreme flexibility of the webbing resiliently deflects affording in effect an annular passage for the flow of air past the fruit at all times, in the same manner as though the fruit were of lesser diameter than the internal diameter of the ring.

In operation, an apple or the like which is to be picked is located within the open end of the head. As soon as such fruit constricts the opening, as by the center of such fruit approaching the plane of the end opening, the flow of air entering the head is substantially reduced, and a vacuum is created within the head. Such vacuum pressure increases, until the pull on the fruit is sufficient to sever the stem, at which moment the fruit is drawn into the head. As soon as the midsection of such fruit passes the upper ends of the slots 62, free flow of air into the head from the open end and into such slots is substantially restored, and suction which would otherwise tend to accelerate the fruit to high velocity is released, whereby the further movement of the fruit is induced by gravity, and such momentum as may have been gained at the instant of severing the stem. At the same time, an air cushioning effect occurs at the lower end of the cylinder as the fruit approaches and engages the valve. The retarded movement and weight of the fruit causes the valve to open for discharge into the conduit 28. It will be seen that the fruit, once it has cleared the open end, causes such vacuum as was created during picking to be promptly dissipated, so that by the time the fruit reaches the valve, the light springs, readily yield to the movement and weight of the fruit to discharge the same through the valve without harm. When the valve opens, some braking is effected by a tendency of air to flow upwardly through the valve, although the free admission of air into the open end of the cylinder tends to moderate this effect. The over-all result is the delivery of the fruit into the discharge conduit gently with no substantial velocity, whereupon its further passage may be controlled by the conduit, through the helix angle chosen.

The head is supported upon one or more sections of rigid tubing suitably connected by telescopic joints. The sleeve 58 on the head shroud 56 is shown as receiving the upper end of the upper section of tubing 80 (see Figure 6), such sleeve being provided with a thumb set screw 82, the end of which is keyed into an aperture 84 in the tube end. A leaf spring 86 confines such screw against becoming misplaced.

The telescopic joints between adjacent sections of tubing (see Figures 10 and 11) are constituted by an expanded end 88 of one tube, having an internal diameter that of the external diameter of the end of the adjacent section. The adjacent section is provided with an aperture 84 adapted to receive a dimple 90 formed in a struck out finger 92 in the expanded diameter end of the upper section, to key the sections. Such finger resiliently permits the coupling and uncoupling of the sections.

At each coupling, there is provided a clamp ring or sleeve, which is formed as a part of a support ring for the helical flexible conduit. Such ring comprises a saddle portion 94, a flexible band portion 96 hingedly connected to one end of the saddle portion as at 98, and a toggle composed of a link 100 and lever 102, the latter being hingedly connected to the other side of the saddle as at 104, and the former engaging a hook 106 at the free end of the band portion. By placing a clamp ring over the telescopic joint between tubes, the finger and dimple may be bound into place so that the dimple and aperture mate to lock the tubing sections together.

The saddle portion 98 supports a large diameter sleeve 108, the axis of which is askew with the axis of the supporting tubing whereby to support and form a coupling for the adjacent ends of sections of helical conduit 28. Such sleeve is provided with reduced diameter conduit seats 110 and 112 to receive adjacent ends 114 and 116 of flexible tubing. A flexible band, the ends of which are provided with a rectangular link 118 arched as at 119 and toggle lever 120, is superimposed over each of said seats, and a pin 122 mounted on the central part of the sleeve as at 124 cooperates with eye forming members 123 on the bands to hold the bands in place and in readiness to be drawn tightly around the adjacent conduit ends.

The same scheme is applied to the joint between the conduit and the sleeve at the base of the valve chamber, there being provided a band 126 loosely keyed as at 128 on a pin 130. Each of the toggle levers may be composed of strips 132 and 134 welded together and provided with the necessary loops for the hinge pin 136 and rectangular link 138 arched in the manner of links 118.

In order to facilitate the operation of the head, to bring the same quickly into position to rapidly pick fruit and successively move on to unpicked fruit, there is provided an elevating device (see Figures 12–16), composed of a U-channel member 140, in which is slidably mounted a plate 142, the latter having spaced brackets 146 and 144 for mounting on the tube 22 and particularly the lowest section thereof.

The channel 140 is provided with inturned spaced flanges 148 and 150, within which the plate 142 slides, the same being guided by a cleat 152, which may be drawn into varying degrees of frictional engagement with the flanges 148 and 150 by the adjustment screw 154. The upper end of the plate may be guided on spaced rollers 155 journaled within the channel member. At a convenient height, there is journaled in the channel member a manual double-ended crank shaft 156 having thereon and disposed centrally within the channel a rack gear 158. Such rack gear in turn meshes with a rack 160 mounted on the inner face of the plate 142, the rack being extended a considerable length so that the plate 142 and in turn the picking head may be moved up or down over a wide range to reach fruit at differing levels.

The lower end of the channel is provided with spaced blocks 162 and 164, each having apertures to receive the shank of a ground-engaging supporting leg 26. Block 162 may be split and provided with a clamp screw to hold any set height desired.

The brackets 146 and 144 are each provided with toggle clamping bands 166 and 168, preferably of the type disclosed in Figure 9, for rigidly holding the lower end of the supply tube.

The various parts, for ease of handling, are preferably constructed as light as possible, so that the picking head may be skillfully and quickly maneuvered from one picking position to another as will readily appear. The head member may be of clear plastic, if desired, to facilitate inspection as well as fabrication.

Where it is desirable to pick relatively green fruit, such as oranges, wherein the stem is tenacious and offers greater rupture resistance, it may be desirable to utilize a stem-cutting knife, adapted to operate in response to the differential pressure created within the head when the open end thereof is momentarily restricted by the presence of a fruit. A head so adapted is shown in Figures 17 and 18. As illustrated, the clamp ring 266 is provided with exterior threads to receive a ring 267 upon which is pivotally mounted as at 269 and 271 a semi-circular cutting member or bale 273. Such member is provided with a cutting edge 275. A short bell crank 277, integral with one end of the member 273, is pivotally connected as at 278 by a piston rod 279 secured at its lower end to a vacuum piston 281, having a cup washer 283, reciprocating in a cylinder 285. Such cylinder is inserted into a modified shroud 256, so as to directly communicate with the suction tube 22, and so that the vacuum pressure within the cylinder 285 is responsive to the vacuum created within the picking head 20. The upper end or head 286 of the cylinder 285 is vented as at 287, and a coil compression spring 289, acting between the head 286 and an offset 288 in the rod 279, acts to properly bias the piston to normally hold the same at the upper end of its stroke.

It will readily appear that when the end of the picking head is open and unrestricted by fruit, the cutter and piston will rest in the position shown. When, however, the open end is restricted by a fruit located therein, vacuum is created within the head, and the piston is drawn downwardly in response thereto, swinging the cutter member 273 to the position 273'. The movement is fast, and the operation such that the cutter traverses a path intersecting the stem of the fruit, whereby the stem is severed by cutting and tension. As soon as the fruit passes into the head, in the manner previously described, the vacuum is dissipated and the spring biases the piston so as to quickly return the cutter to the normal position shown. To vary the cutting height, the ring 267 may be axially moved by means of the threaded mounting on the clamp ring 266, it being necessary to disconnect the piston rod from the bell crank, or free the cutter member from the ring 267 by springing the pivotal connections from the ring in order to permit the ring to be threaded up or down as desired. While a cylinder and piston is shown, any differential pressure motor may be employed, such as, for example, a bellows or diaphragm type, as will be readily understood.

It will be readily apparent that the apparatus thus described may be constructed of light materials so as to be readily and expeditiously handled in the rapid picking of the fruit. Any number of tube sections may be assembled to provide the approximate range desired, and the flexible conduit may be resiliently extendable and be coiled around the tube sections as many times as is desirable to provide a proper retarding effect in the travel of the fruit to the ground.

By reason of the gentle action of the picking head, injury to the fruit is avoided. Within the head, the buoying or floating action resulting from the cushioning effect of the surrounding air within the head assists in protecting fruit against possible damage.

While several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a fruit picking device, a head construction comprising a tubular member providing a walled passageway for fruit, said member having one end open and having a normally closed fruit discharge valve at the other end, said tubular member having a plurality of ports therein spaced over substantially the entire length and circumference of the wall affording relatively free communication through the wall over substantially the entire length thereof, and means disposed externally of said member and coacting therewith to form an annular chamber, said means having a port adapted to be connected to a source of vacuum.

2. In a fruit picking device, a head construction comprising a tubular member providing a walled passageway for fruit, said member having one end open and having a normally closed fruit discharge valve at the other end, said tubular member having a plurality of ports therein spaced over substantially the entire length and circumference of the wall affording relatively free communication through the wall over substantially the entire length thereof, a vacuum supply jacket surrounding substantially the entire length of said tubular member in spaced relation thereto to form with said tubular member an annular space, and means associated with said jacket for connecting the annular space between said member and jacket to a source of vacuum, said means comprising a port in said jacket.

3. In a fruit picking device, a head construction comprising a substantially cylindrical wall providing a passageway open at one end and having a normally closed discharge valve at the other end, a vacuum supply jacket surrounding substantially the entire length of said cylindrical wall, and means comprising a port in said jacket for connecting said annular space with a source of vacuum, said cylinder wall having a plurality of lengthwise extending slots therein uniformly disposed circumferentially around the wall affording communication from said passageway to said annular space.

4. In a fruit picking device, a head construction comprising a substantially cylindrical wall providing a passageway open at one end and having a normally closed discharge valve at the other end, a vacuum supply jacket surrounding substantially the entire length of said cylindrical wall and forming with said cylindrical wall an annular space around the cylindrical wall, and means comprising a port in said jacket for connecting said annular space with a source of vacuum, said wall having a plurality of ports therein spaced over substantially the entire length and circumference thereof affording free communication between said annular space and said passageway over substantially the entire length thereof.

5. In a fruit picking device, a head construction comprising a member having a tubular wall providing a passageway for fruit, and having one end open and a normally closed valve at the other end, said wall having a plurality of ports therein spaced over substantially the entire length and circumference thereof and affording free communication therethrough at any point along the length thereof, and a vacuum supply jacket surrounding substantially the entire length of said wall and coacting therewith to form an annular chamber.

6. In a fruit picking device, a head construction comprising a member having a tubular wall providing a passageway for fruit, and having one end open and a normally closed valve at the other end, said wall having a plurality of ports therein spaced over substantially the entire length and circumference thereof and affording free communication therethrough at any point along the length thereof, a vacuum supply jacket surrounding substantially the entire length of said wall and coacting therewith to form an annular chamber, a discharge chamber located beneath said valve and adapted to receive fruit discharged therethrough, tubular vacuum supply support means for said jacket, and a conduit helically arranged about said tubular support means and having its upper end connected to said discharge chamber.

7. In a fruit picking device, a head construction comprising a substantially cylindrical wall, providing a passageway, said wall being open at one end, and connecting with a valve chamber at the other, a flap valve disposed in said chamber and normally closing the other end of said cylindrical wall, and a vacuum distributing jacket surrounding said wall and coacting therewith to form an annular chamber, said cylindrical wall having a plurality of ports disposed over substantially the entire length and circumference thereof affording free communication from said passageway to said jacket at any point along substantially the entire length thereof, whereby flow of air through said open end and into said jacket is constricted by fruit when positioned in the open end only.

8. In a fruit picking device, a tubular guide member in the form of a tubular wall open at one end and having a resiliently closed fruit discharge valve at the other, said wall having a multiplicity of ports arranged around the entire circumference and extending over substantially the entire length thereof, a jacket surrounding said tubular wall and forming with said tubular wall an annular enclosure communicating with the interior of said guide member through said ports, and means associated with said jacket for connecting said annular enclosure with a source of vacuum, said means comprising a port in said jacket.

9. In a fruit picking device, a head comprising a tubular guide member in the form of a tubular wall open at one end and having a normally closed fruit discharge valve at the other, said wall having a multiplicity of ports arranged around the entire circumference and extending over substantially the entire length thereof, and a jacket surrounding said tubular wall and forming with said tubular wall an annular enclosure communicating with the interior of said guide member through said ports, an elongated tubular vacuum supply and support means upon which said head is mounted and connecting with said jacket and communicating with said annular enclosure, a discharge conduit connecting with said guide member on the discharge side of said valve, and means for mounting a substantial portion of said discharge conduit upon said tubular support means in substantially helical relation therearound.

10. In a fruit picking device, a head construction comprising a substantially cylindrical wall, providing a passageway, said wall being open at one end, and connecting with a valve chamber at the other, a flap valve disposed in said chamber and normally closing the other end of said cylindrical wall, a vacuum distributing jacket surrounding said wall, said cylindrical wall having a plurality of ports therein disposed over substantially the entire length and circumference thereof affording communication from said passageway to said jacket, a cutter pivotally mounted on the open end of said wall and adapted to swing in an arc over said end, and a differential pressure motor operatively connected with said cutter and acting in response to vacuum within said cylindrical wall.

11. In a fruit picking device, a vacuum head construction comprising a tubular member, providing a passageway for fruit, said member having ports in its wall and being open at one end and having a normally closed discharge valve at the other end, means surrounding a substantial part of said tubular member and adapted for supplying vacuum to said tubular member intermediate the ends thereof said means comprising an external jacket forming with said member an annular chamber, and said jacket having a port adapted to be connected to a source of vacuum, a stem cutter mounted on the member for movement across the open end thereof, and means operatively connected with said cutter and responsive to vacuum within the member for actuating said cutter.

12. In a fruit picking device, a tubular guide member in the form of a tubular wall open at one end and having a resiliently closed fruit discharge valve at the other, said wall having a multiplicity of ports arranged around the entire circumference and extending over substantially the entire length thereof, a jacket surrounding said tubular wall and forming with said tubular wall an annular enclosure communicating with the interior of said guide member through said ports, means comprising a port in said jacket for connecting said annular enclosure with a source of vacuum, and an annular resilient constricting member mounted upon the open end of the tubular wall, said constricting member having inwardly directed resilient supporting fingers, and thin resilient webbing interconnecting said fingers on the under side thereof.

References Cited in the file of this patent

UNITED STATES PATENTS

| Number | Name | Date |
|---|---|---|
| 291,321 | Focke | Jan. 1, 1884 |
| 355,866 | Crane | Jan. 11, 1887 |
| 762,096 | Seymour | June 7, 1904 |
| 1,218,021 | Walther | Mar. 6, 1917 |
| 1,289,752 | Hawkins | Dec. 31, 1918 |
| 1,798,553 | Nicholson | Mar. 31, 1931 |
| 2,231,728 | Maher | Feb. 11, 1941 |
| 2,545,072 | Denman | Mar. 13, 1951 |

FOREIGN PATENTS

| Number | Country | Date |
|---|---|---|
| 31,445 | Austria | Jan. 25, 1908 |